United States Patent
Tsuzuku et al.

(10) Patent No.: US 12,521,534 B2
(45) Date of Patent: Jan. 13, 2026

(54) DILATORS

(71) Applicant: ASAHI INTECC CO., LTD., Seto (JP)

(72) Inventors: Marina Tsuzuku, Seto (JP); Yukihiro Fuseya, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 445 days.

(21) Appl. No.: 18/059,725

(22) Filed: Nov. 29, 2022

(65) Prior Publication Data

US 2023/0093541 A1    Mar. 23, 2023

Related U.S. Application Data (63) Continuation of application No. PCT/JP2021/015008, filed on Apr. 9, 2021.

(30) Foreign Application Priority Data

Jun. 1, 2020 (JP) ................... 2020-095450

(51) Int. Cl.
*A61M 29/00* (2006.01)
(52) U.S. Cl.
CPC .................. *A61M 29/00* (2013.01)
(58) Field of Classification Search
CPC ........... A61M 2025/0687; A61M 2025/09058; A61M 2025/09066; A61M 2025/091; A61M 2025/320044; A61M 2025/349
See application file for complete search history.

(56) References Cited

U.S. PATENT DOCUMENTS

| | | | |
|---|---|---|---|
| 6,355,016 B1 * | 3/2002 | Bagaoisan | A61M 25/09033 604/528 |
| 2007/0093783 A1 * | 4/2007 | Kugler | A61M 25/09 604/510 |
| 2007/0255217 A1 * | 11/2007 | Burkett | B29C 48/12 604/164.13 |
| 2008/0281230 A1 | 11/2008 | Kinoshita et al. | |
| 2010/0004561 A1 * | 1/2010 | Nabeshima | A61M 25/09 600/585 |

(Continued)

FOREIGN PATENT DOCUMENTS

| | | | |
|---|---|---|---|
| JP | WO 2013/038720 A1 | 3/2013 | |
| JP | 5526218 B2 | 6/2014 | |

(Continued)

*Primary Examiner* — Martin T Ton
(74) *Attorney, Agent, or Firm* — Norton Rose Fulbright US LLP (57) ABSTRACT

A dilator includes: a hollow shaft having a tapered portion whose outer diameter of the distal end is smaller than the outer diameter of the proximal end; a distal tip, whose proximal end is located at the distal end of the tapered portion, and which is provided to extend toward the distal end direction; and a spirally-arranged protruding portion provided on at least the outer peripheral surface of the tapered portion. The spirally-arranged protruding portion is formed by winding a wire and has gaps between portions adjacent to each other along the longitudinal direction of the hollow shaft. The inner peripheral radius CIDmin of a portion, which is the minimum inner peripheral radius of the spirally-arranged protruding portion, is smaller than the outer peripheral radius TODmax of a portion, which is the maximum outer peripheral radius of the distal tip.

13 Claims, 5 Drawing Sheets

(56) References Cited

U.S. PATENT DOCUMENTS

| | | | |
|---|---|---|---|
| 2010/0069880 A1* | 3/2010 | Grayzel | A61M 25/0662 |
| | | | 604/509 |
| 2010/0168619 A1* | 7/2010 | Elsesser | A61M 25/09 |
| | | | 600/585 |
| 2014/0288496 A1* | 9/2014 | Miyoshi | A61B 1/31 |
| | | | 604/95.01 |
| 2014/0336594 A1* | 11/2014 | Tano | A61M 25/09 |
| | | | 604/265 |
| 2015/0157830 A1* | 6/2015 | Miyata | A61M 25/09 |
| | | | 604/528 |
| 2016/0101265 A1 | 4/2016 | Grayzel et al. | |
| 2018/0056042 A1* | 3/2018 | Kanetake | H05B 6/108 |
| 2020/0016384 A1 | 1/2020 | Fuseya et al. | |
| 2020/0016385 A1 | 1/2020 | Fuseya et al. | |
| 2020/0016386 A1 | 1/2020 | Fuseya et al. | |
| 2020/0016387 A1* | 1/2020 | Fuseya | A61M 25/0053 |
| 2021/0001097 A1 | 1/2021 | Fuseya et al. | |
| 2021/0001098 A1 | 1/2021 | Fuseya et al. | |
| 2021/0069480 A1 | 3/2021 | Fuseya et al. | |
| 2021/0077794 A1 | 3/2021 | Fuseya et al. | |
| 2021/0077795 A1 | 3/2021 | Fuseya et al. | |
| 2022/0288365 A1 | 9/2022 | Fuseya et al. | |

FOREIGN PATENT DOCUMENTS

| | | |
|---|---|---|
| JP | WO 2018/174240 A1 | 9/2018 |
| WO | WO 2019/225025 A1 | 11/2019 |

* cited by examiner

DILATORS

CROSS-REFERENCE TO RELATED APPLICATION

This application is a continuation application of International Application No. PCT/JP2021/015008, filed Apr. 9, 2021, which claims priority to Japanese Patent Application No. 2020-095450, filed Jun. 1, 2020. The contents of these applications are incorporated herein by reference in their entireties.

FIELD OF INVENTION

The disclosed embodiments relate to a dilator.

BACKGROUND

A dilator is known as, for example, an instrument for expanding a hole made in a body surface or an organ, etc., or expanding a constricted part formed in a bile duct or a pancreatic duct, etc.

Such a dilator requires a strong propulsive force for expansion, and thus an example thereof disclosed is a dilator that is provided with a coil body on the outer peripheral surface of the tapered portion of a shaft for expansion, so as to supplement the propulsive force by the use of the screwing action resulting from rotation, according to WO 2013/038720 A1.

The coil body as described above is configured by, for example, winding a wire around the outer peripheral surface of the above tapered portion, whereby the coil body can be easily formed.

SUMMARY

However, a conventional dilator as described above is configured such that a wire forming a coil body is simply wound around the outer peripheral surface of a shaft, and thus may cause a risk that the coil body is detached from the shaft due to a drag force from tissues upon expansion of a hole or tensile force upon withdrawal.

The disclosed embodiments have been made in view of the above circumstances, and an object of the disclosed embodiments is to provide a dilator capable of preventing a spirally-arranged protruding portion from being detached from the hollow shaft.

To achieve the above object, a dilator according to an embodiment of the present disclosure includes a hollow shaft having a tapered portion whose outer diameter of the distal end is smaller than the outer diameter of the proximal end; a distal tip, whose proximal end is located at the distal end of the tapered portion, and which is provided to extend toward the distal end direction; and a spirally-arranged protruding portion provided on at least the outer peripheral surface of the tapered portion.

The spirally-arranged protruding portion is formed by winding a wire and has gaps between portions adjacent to each other along the longitudinal direction of the hollow shaft.

The inner peripheral radius of a portion, which is the minimum inner peripheral radius of the spirally-arranged protruding portion, is smaller than the outer peripheral radius of a portion, which is the maximum outer peripheral radius of the distal tip.

The terms "comprise" and any form thereof such as "comprises" and "comprising," "have" and any form thereof such as "has" and "having," and "include" and any form thereof such as "includes" and "including" are open-ended linking verbs. As a result, a device, like a dilator, that "comprises," "has," or "includes" one or more elements possesses those one or more elements, but is not limited to possessing only those elements.

Any embodiment of any of the devices can consist of or consist essentially of—rather than comprise/include/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

DETAILED DESCRIPTION

A dilator of at least some embodiments of the present disclosure includes: a hollow shaft having a tapered portion whose outer diameter of the distal end is smaller than the outer diameter of the proximal end; a distal tip, whose proximal end is located at the distal end of the tapered portion, and which is provided to extend toward the distal end direction; and a spirally-arranged protruding portion provided on at least the outer peripheral surface of the tapered portion. The spirally-arranged protruding portion is formed by winding a wire and has gaps between portions adjacent to each other along the longitudinal direction of the hollow shaft. The inner peripheral radius of a portion, which is the minimum inner peripheral radius of the spirally-arranged protruding portion, is smaller than the outer peripheral radius of a portion, which is the maximum outer peripheral radius of the distal tip.

Note that in the specification, the "distal end direction" is a direction along the longitudinal direction of a dilator and refers to a direction along which the dilator is advanced toward a portion having an expanded diameter. The "proximal end direction" is a direction along the longitudinal direction of the dilator, and refers to a direction opposite to the distal end direction. Moreover, the "distal end" refers to an end in the distal end direction of an arbitrary member or portion, and the "proximal end" refers to an end in the proximal end direction of an arbitrary member or portion. The "inner peripheral radius" refers to the distance between the long axis of a dilator and the innermost peripheral part of a relevant portion, and the "outer peripheral radius" refers to the distance between the long axis of the dilator and the outermost peripheral part of the relevant portion. The "longitudinal direction" refers to the longitudinal direction of a dilator, unless otherwise specified.

Hereinafter, some embodiments of the present disclosure are described with reference to the enclosed drawings. However, the disclosed embodiments are not limited to the embodiments illustrated in the drawings. Moreover, the size of the dilator in each drawing is a size illustrated to facilitate understanding of the embodiments, and does not necessarily correspond to the actual size.

Figure 1:
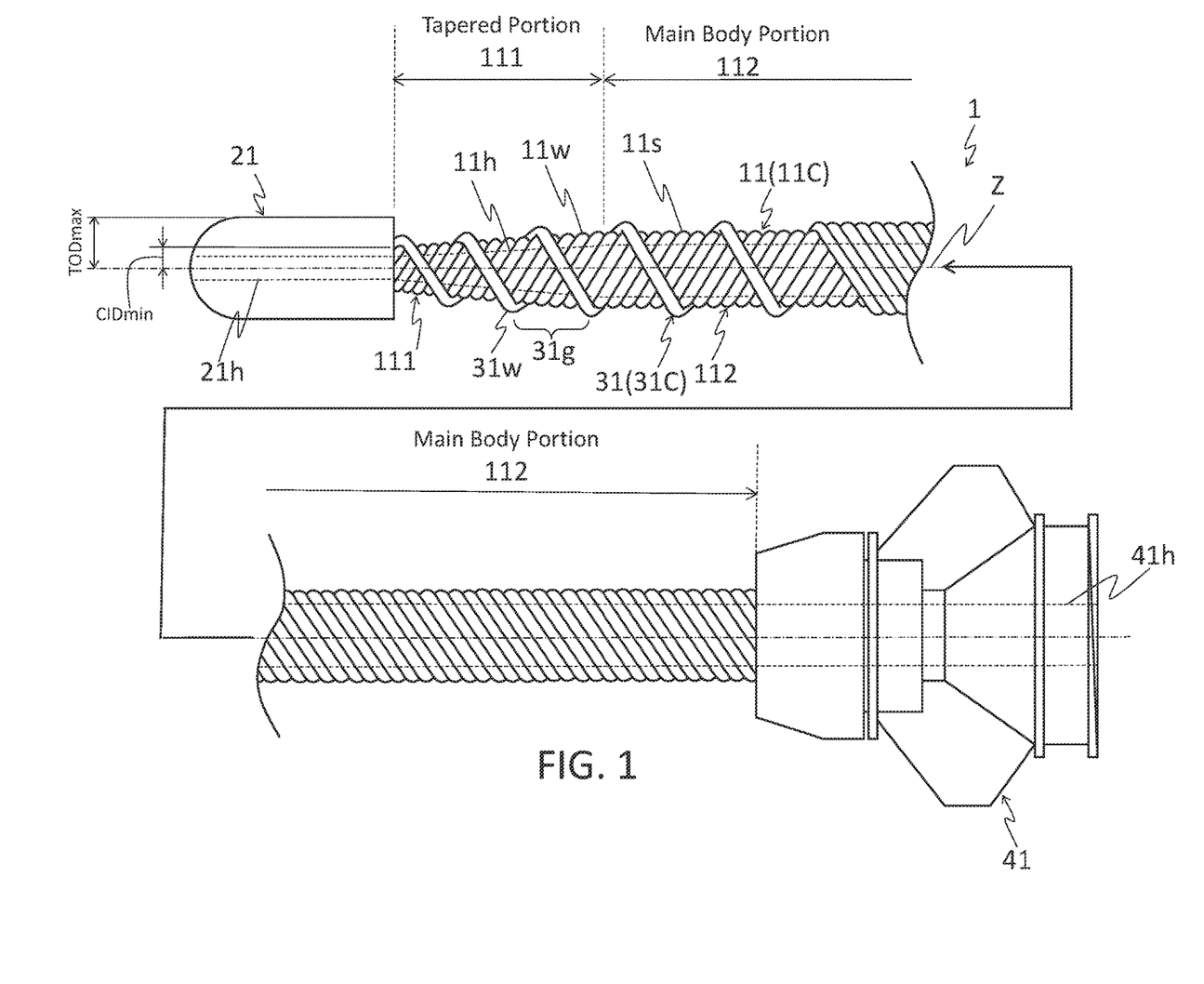
FIG. 1 is a schematic side view illustrating an embodiment of a dilator of the present disclosure.

FIG. 1 is a schematic side view illustrating a dilator 1. The dilator 1 includes a hollow shaft 11, a distal tip 21, a spirally-arranged protruding portion 31, and a base portion 41, as shown in FIG. 1.

The hollow shaft 11 is a hollow-shaped shaft. The hollow shaft 11 has a tapered portion 111, a main body portion 112, and an inner cavity 11$h$, for example.

The tapered portion 111 is a portion whose outer diameter of the distal end is smaller than the outer diameter of the proximal end. Specifically, the tapered portion 111 can be exemplified as having an outer diameter that increases linearly from the distal end to the proximal end (see FIG. 1), an outer diameter that increases from the distal end to the proximal end (not shown) while the surface is curved in a convex or concave shape, or the like.

The main body portion 112, whose distal end is located at the proximal end of the tapered portion 111, is a portion provided to extend toward the proximal end side. The main body portion 112 can be configured in such a manner that the main body portion 112 has a given outer diameter from the distal end to the proximal end thereof.

The inner cavity 11$h$ is a through-hole for insertion of a guide wire (not shown), etc. The inner cavity 11$h$ can be configured to have a continuous space (for example, a portion inside the common inscribed lines indicated with broken lines in FIG. 1) penetrating from the distal end to the proximal end of the hollow shaft 11 along the longitudinal direction, for example.

The tapered portion 111 and the main body portion 112 may be integrally formed or may be formed as separate bodies. The hollow shaft 11 of the dilator 1 is configured of a coil body 11C (hereinafter, also referred to as "first coil body 11C"), wherein the tapered portion 111 and the main body portion 112 are integrally formed and a wire 11$w$ made of one solid wire is continuously and spirally wound around the long axis Z of the dilator 1 to form the coil body 11C. Since the hollow shaft 11 is formed by winding the wire 11$w$, torqueability (the certainty of transmitting the rotational force applied to the proximal end portion of the dilator 1 to the distal end portion) can be increased.

Materials forming the hollow shaft 11 are preferably antithrombotic, flexible, and biocompatible because the dilator 1 is to be inserted into a body cavity. Examples of the above materials that can be employed herein include resin materials such as a polyamide resin, a polyolefin resin, a polyester resin, a polyurethane resin, a silicone resin, and a fluorocarbon resin, and metal materials such as stainless steel and superelastic alloys (a nickel-titanium alloy). The materials forming the tapered portion 111 and the main body portion 112 may be the same materials or different materials.

The tapered portion 111 and the main body portion 112 of the first coil body 11C may be formed integrally or separately. Further, the tapered portion 111 and the main body portion 112 may be formed of the same or different materials. Further, the wire diameters of the coil body composed of the tapered portion 111 and the main body portion 112 may be the same or different. The tapered portion 111 and the main body portion 112 of the first coil body 11C in the dilator 1 are formed by spirally winding the solid wire 11$w$ that is made of the same material and has the same wire diameter.

Note that the hollow shaft 11 may have various coatings (not shown) on the side of the outer peripheral surface 11$s$ thereof. Examples of the coatings include a protective film (plating film and the like) for protecting the surface of the hollow shaft 11, a base film, etc., for improving the adhesion between the hollow shaft 11 and the spirally-arranged protruding portion 31 (described later).

A distal tip 21, whose proximal end is located at the distal end of the tapered portion 111, is a member provided to extend toward the distal end direction. The distal tip 21 can be specifically formed as, for example, the distal tip 21 tapers toward the distal end side, so that the dilator 1 can be more easily advanced within a body cavity.

The distal tip 21 may have an inner cavity 21$h$. The inner cavity 21$h$ can be configured so that it penetrates from the distal end to the proximal end of the distal tip 21, so as to communicate with the inner cavity 11$h$ of the hollow shaft 11.

The material forming the distal tip 21 preferably has flexibility for the dilator 1 to be advanced in a body cavity. Examples of such material forming the distal tip 21 include resin materials such as polyurethane and polyurethane elastomer.

The spirally-arranged protruding portion 31 is a portion provided on at least the outer peripheral surface of the tapered portion 111. The spirally-arranged protruding portion 31 is configured of a coil body 31C (hereinafter, may also be referred to as "second coil body 31C") formed by winding a wire and has gaps 31$g$ at portions adjacent to each other along the longitudinal direction of the hollow shaft. Specifically, the spirally-arranged protruding portion 31 can be formed, for example, by spirally winding a continuous or intermittent single-thread or multi-thread wire(s) 31$w$ along the longitudinal direction of the hollow shaft 11 in such a manner that the wire(s) 31$w$ is in contact with the outer peripheral surface 11$s$. In the dilator 1, the spirally-arranged protruding portion 31 is provided on the outer peripheral surface 11$s$ of the tapered portion 111 and the main body portion 112.

The wire(s) 31$w$ forming the spirally-arranged protruding portion 31 may be a solid wire, twisted wires, or a combination of a solid wire and twisted wires. Note that the "solid wire" refers to a single wire and the "twisted wires" refers to a bundle (group) of wires formed by twisting a plurality of single wires with each other in advance.

As materials forming the spirally-arranged protruding portion 31, for example, the same materials or the like that form the hollow shaft 11 can be employed.

Figure 2:
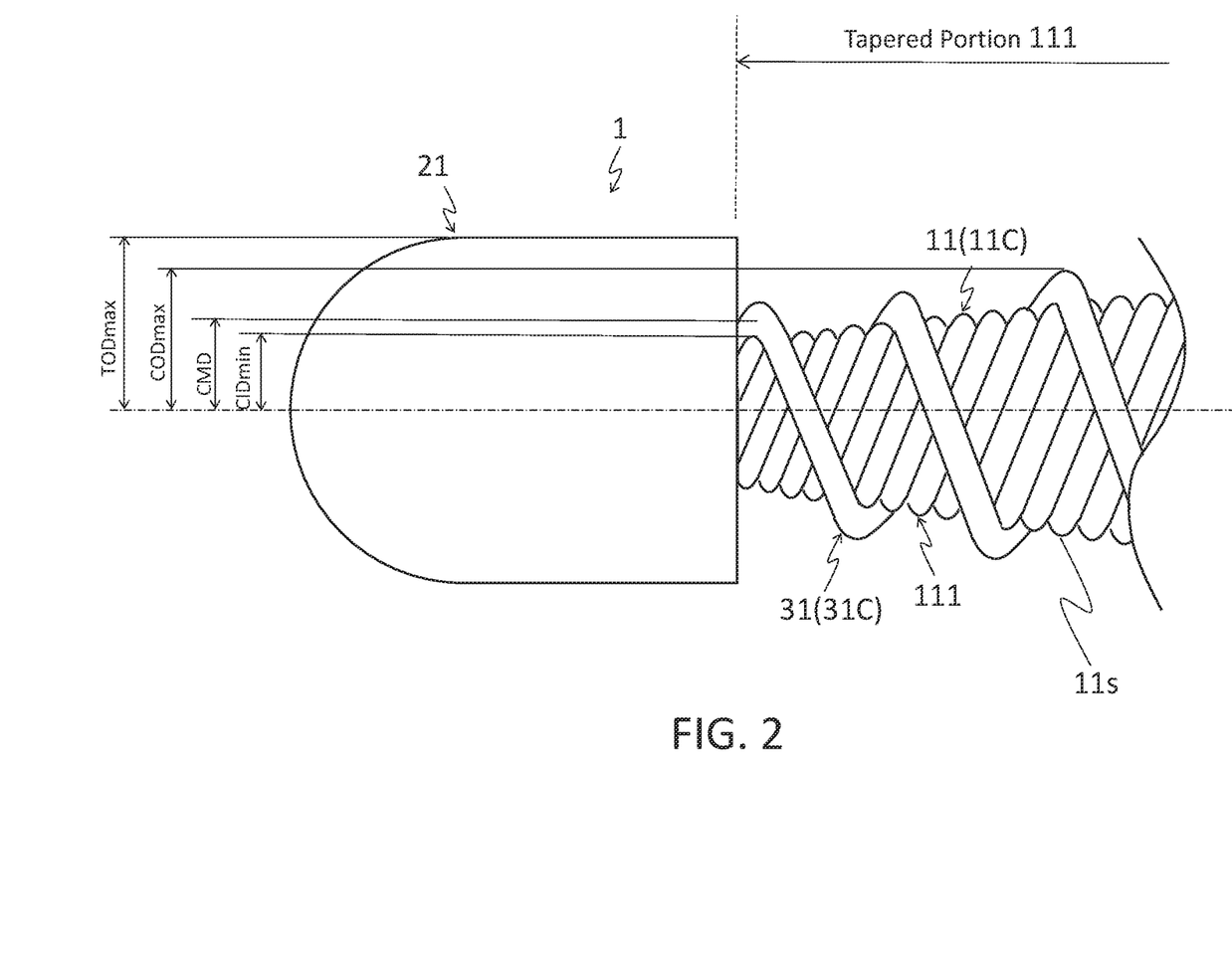
FIG. 2 is a schematic side view illustrating a part of the dilator of FIG. 1 in an enlarged manner.

Here, the spirally-arranged protruding portion 31 and the distal tip 21 of the dilator 1 are formed as shown in FIG. 2 such that the inner peripheral radius (CIDmin) of a portion, which is the minimum inner peripheral radius of the spirally-arranged protruding portion 31, is smaller than the outer peripheral radius (TODmax) of a portion, which is the maximum outer peripheral radius of the distal tip 21 (CIDmin<TODmax).

Further, the spirally-arranged protruding portion 31 and the distal tip 21 may be formed in such a manner that the distance (CMD, hereinafter may also be referred to as "center of minimum distance") between the long axis of the hollow shaft 11 and the center of a wire at a portion having the minimum inner peripheral radius of the spirally-arranged protruding portion 31, is smaller than the outer peripheral radius (TODmax) of a portion, which is the maximum outer peripheral radius of the distal tip 21 (see FIG. 1 and FIG. 2). Specifically, for example, appropriate selection of the wire diameter of the second coil body 31C, the outer peripheral radius (TODmax) of the distal tip 21, and an outer peripheral radius of the tapered portion 111 can make the center of minimum distance (CMD) of the spirally-arranged protruding portion 31 smaller than the outer peripheral radius (TODmax) of the distal tip 21. This can ensure the prevention of the detachment of the spirally-arranged protruding portion 31 from the hollow shaft 11.

Such a portion having the minimum inner peripheral radius (the portion of the spirally-arranged protruding portion, having the inner peripheral radius (CIDmin)) of the spirally-arranged portion 31 may be located at any position along the spirally-arranged protruding portion 31 unless the position would otherwise impair the utility of the dilator 1. For example, the portion of the spirally-arranged protruding portion 31 having the inner peripheral radius (CIDmin) may be located at the distal end of the spirally-arranged protruding portion 31 in the longitudinal direction (see FIG. 1 and FIG. 2) or located in the middle of the spirally-arranged protruding portion 31 in the longitudinal direction (not shown).

In the dilator 1, the portion of the spirally-arranged protruding portion 31 having the inner peripheral radius (CIDmin) is disposed at the distal end of the spirally-arranged protruding portion 31. This makes it possible to prevent the spirally-arranged protruding portion 31 from protruding from the distal tip 21 toward the distal end direction. For example, this can inhibit the second coil body 31C from damaging the tissues.

The spirally-arranged protruding portion 31 and the tapered portion 111 may be joined or not joined to each other (the two portions are in a state where they are simply in contact with each other) at least a part of the portion where the two portions are in contact with each other.

In the dilator 1, the spirally-arranged protruding portion 31 and the tapered portion 111 are not joined to each other and the second coil body 31C is wound around the peripheral surface 11s of the hollow shaft 11 in a state of being simply in contact with the outer peripheral surface 11s. This can suppress a decrease in the flexibility of the portion of the dilator 1 corresponding to the tapered portion 111.

The base portion 41 is a site where a technician operates the dilator 1. The base portion 41 has, for example, an inner cavity 41h that communicates with an inner cavity 11h of the hollow shaft 11 and penetrates (or extends) from the distal end to the proximal end. The base portion 41 can be configured such that the distal end is connected to the proximal end of the hollow shaft 11. Upon operation, a guide wire or the like is inserted into the inner cavity 41h, for example. Further, when the base portion 41 is rotated, the hollow shaft 11, the distal tip 21 and the spirally-arranged protruding portion 31 are rotated together.

Next, a use mode of the dilator 1 is described as follows. Here, an operation for expanding a portion to be expanded such as a chronic total occlusion (CTO) formed in a blood vessel using the dilator 1 is described.

First, use an introducer needle (not shown) to make a hole while puncturing a portion to be expanded. Next, after insertion of a guide wire (not shown) into the inner cavity of the introducer needle, pull out the introducer needle. Next, insert the proximal end of the guide wire into the inner cavity 21h from the distal end side of distal tip 21, and push the hollow shaft 11 until it reaches the portion to be expanded. At this time, advance the distal end portion of the dilator 1 while following the shape of the curved portion to be inserted (for example, blood vessel, esophagus, stomach, bile duct, etc.).

Next, after insertion of the distal end portion of the dilator 1 with its distal tip 21 at the head of the dilator 1 into the hole made in the portion to be expanded, operate the base portion 41 to expand the hole by the tapered portion 111 while rotating and advancing the hollow shaft 11. At this time, because the dilator 1 has been formed such that the inner peripheral radius (CIDmin) is smaller than the outer peripheral radius (TODmax), the portion to be expanded is smoothly expanded without causing detachment of the second coil body 31C from the hollow shaft 11.

The dilator 1 is configured as described above, so as to be able to prevent the spirally-arranged protruding portion 31 from being detached from the hollow shaft 11 and to allow smooth operation.

Figure 3:
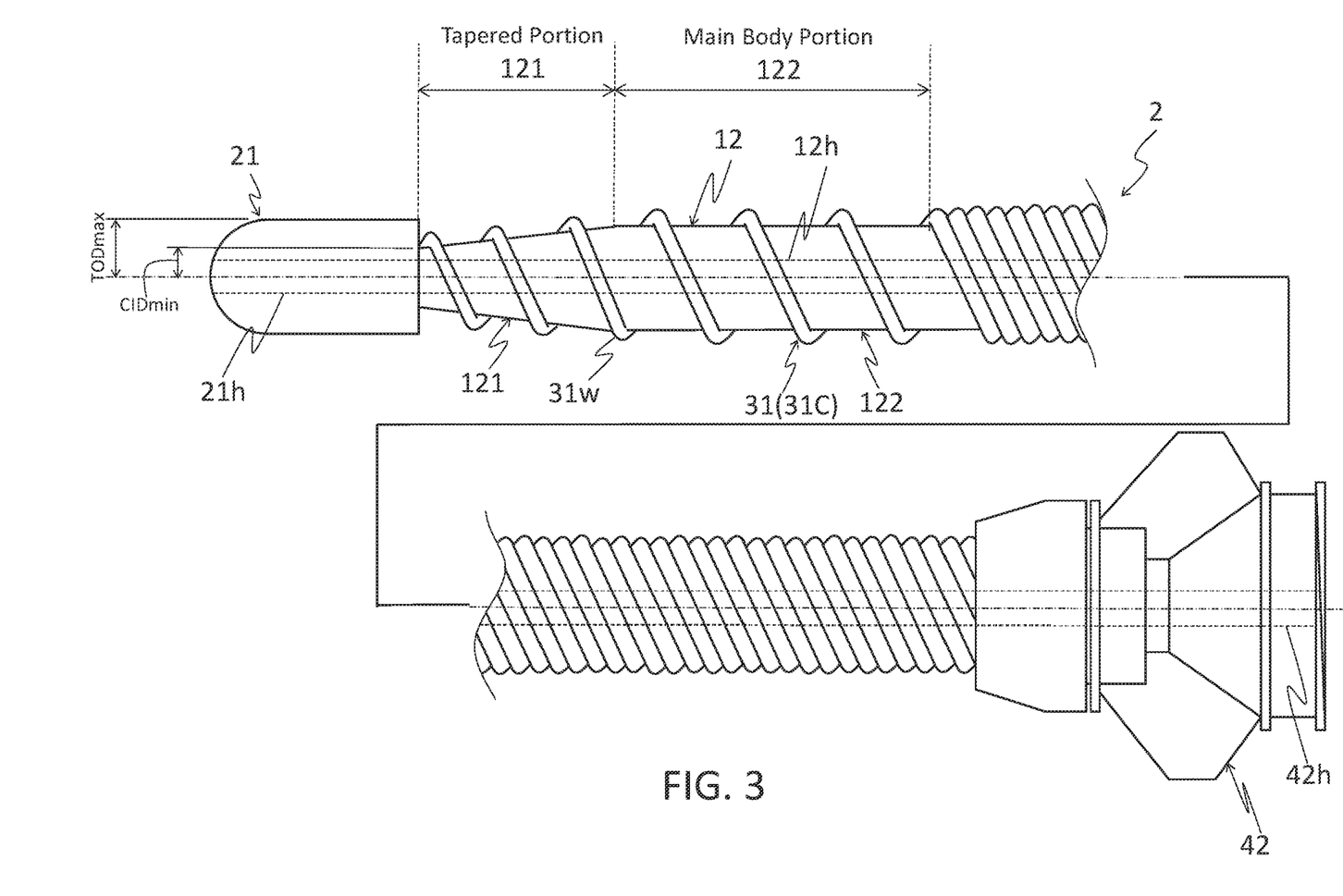
FIG. 3 is a schematic side view illustrating another embodiment of a dilator of the present disclosure.

FIG. 3 is a schematic side view illustrating a dilator 2. The dilator 2 includes a hollow shaft 12, a distal tip 21, a spirally-arranged protruding portion 31, and a base portion 42, as shown in FIG. 3. The dilator 2 differs from that of the dilator 1 in that it includes the hollow shaft 12 and the base portion 42. Since the configurations of the distal tip 21 and the spirally-arranged protruding portion 31 are the same as those of the dilator 1, the same portions/positions are represented by the same reference signs, and detailed descriptions thereof will not be repeated. Further, since the configurations other than the configurations of the hollow shaft 12 and the base portion 42 described below and the use mode of the dilator 2 are the same as those of the dilator 1, detailed descriptions thereof will not be repeated.

The hollow shaft 12 is a hollow-shaped shaft. The hollow shaft 12 has a tapered portion 121, a main body portion 122, and an inner cavity 12h, for example.

The tapered portion 121 is a portion, wherein the outer diameter of the distal end is smaller than the outer diameter of the proximal end. The main body portion 122, whose distal end is located at the proximal end of the tapered portion 121, is a portion provided to extend toward the proximal end side. The inner cavity 12h is a through-hole for insertion of a guide wire (not shown) or the like.

The tapered portion 121 and the main body portion 122 may be formed integrally or separately. Note that the tapered portion 121 and the main body portion 122 may be formed of the same or different materials. Further, the tapered portion 121 and the main body portion 122 may have the same or different wall thicknesses. The tapered portion 121 and the main body portion 122 of the dilator 2 are formed using the same materials integrally by casting or the like so as to have different wall thicknesses (the inner cavity 12h having a given inner diameter from the distal end to the proximal end of the hollow shaft 12).

The base portion 42 is a site where a technician operates the dilator 2. The base portion 42 of the dilator 2 has an inner cavity 42h having the same inner diameter as that of the inner cavity 12h, wherein the inner cavity 42h communicates with the inner cavity 12h of the hollow shaft 12 and penetrates (or extends) from the distal end to the proximal end.

The dilator 2 is configured as described above, so as to be able to prevent the spirally-arranged protruding portion 31 from being detached from the hollow shaft 12 and to allow smooth operation.

Figure 4:
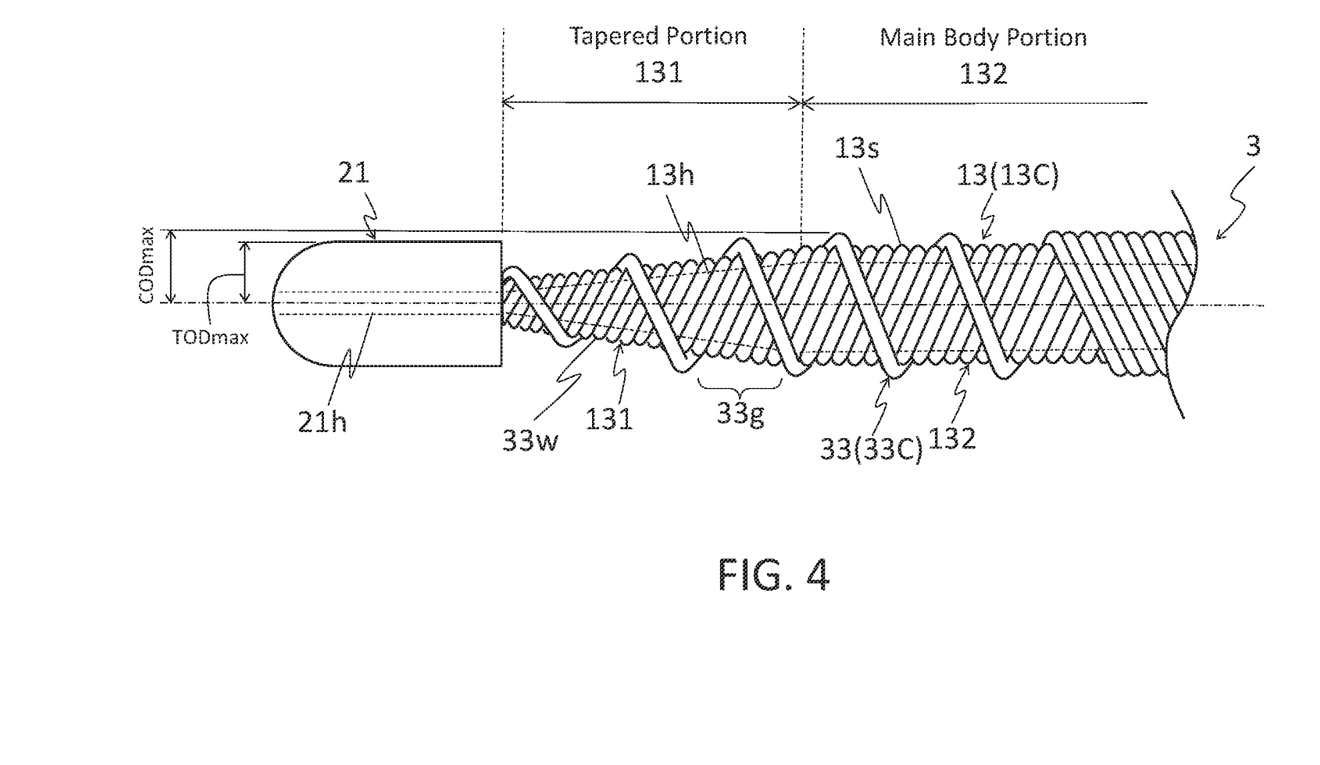
FIG. 4 is a schematic side view illustrating another embodiment of a dilator of the present disclosure.

FIG. 4 is a schematic side view illustrating a dilator 3. The dilator 3 includes a hollow shaft 13, a distal tip 21, a spirally-arranged protruding portion 33, and a base portion 41 (not shown), as shown in FIG. 4. The dilator 3 differs from that of the dilator 1 in that it includes the hollow shaft 13 and the spirally-arranged protruding portion 33. Since the configurations of the distal tip 21 and the base portion 41 are the same as those of the dilator 1, the same portions/positions are represented by the same reference signs, and detailed descriptions thereof will not be repeated. Further, since the configurations other than the configurations of the hollow shaft 13 and the spirally-arranged protruding portion 33, and the use mode of the dilator 3 shown below are the same as those of the dilator 1, detailed descriptions thereof will not be repeated.

The hollow shaft 13 is a hollow-shaped shaft. The hollow shaft 13 has a tapered portion 131, a main body portion 132, and an inner cavity 13h, for example.

The tapered portion 131 is a portion, wherein the outer diameter of the distal end is smaller than the outer diameter of the proximal end. The main body portion 132, whose distal end is located at the proximal end of the tapered portion 131, is a portion provided to extend toward the proximal end side. The main body portion 132 has the same outer diameter as that of the proximal end of the tapered portion 131. The inner cavity 13h is a through-hole for insertion of a guide wire (not shown) or the like.

The spirally-arranged protruding portion 33 is a portion provided on at least the outer peripheral surface of the tapered portion. The spirally-arranged protruding portion 33 is configured of a coil body 33C ("second coil body 33C") formed by winding a wire 33w and has gaps 33g at portions adjacent to each other along the longitudinal direction of the hollow shaft 13.

Further, the dilator 3 is formed in such a manner that the outer peripheral radius (CODmax) of a portion, which is the maximum outer peripheral radius of the spirally-arranged protruding portion 33, is larger than the outer peripheral radius (TODmax) of a portion, which is the maximum outer peripheral radius of the distal tip 21. Specifically, for example, the dilator 3 may be formed in such a manner that the outer diameter of the proximal end of the tapered portion 131 of the above hollow shaft 13 is larger than that of the tapered portion 111 of the dilator 1 (see FIG. 4). Through appropriate adjustment of the wire diameter of the second coil body 33C, the outer peripheral radius (CODmax) of the second coil body 33C may be larger than the outer peripheral radius (TODmax) of the distal tip 21 (not shown). Such a portion of the spirally-arranged protruding portion 33 having the outer peripheral radius (CODmax) may be a portion on the tapered portion 131 (not shown) or a portion on the main body portion 132 (see FIG. 4).

Further, another configuration is possible, such that the outer peripheral radius (CODmax) of a portion, which is the maximum outer peripheral radius among those of portions provided on the outer peripheral surface 13s of the tapered portion 131 of the spirally-arranged protruding portion 33, is larger than the outer peripheral radius (TODmax) of a portion, which is the maximum outer peripheral radius of the distal tip 21. This can further increase the propulsive force of the dilator 3 resulting from the screwing action during expansion of the tissue (while the tapered portion 131 passes through the portion to be expanded).

The dilator 3 is as configured above. Hence, the outer periphery of the spirally-arranged protruding portion 33 protrudes from the distal tip 21 as in a front view (when the dilator 3 is viewed from the distal end side in the longitudinal direction to the distal tip 21), so as to be able to increase the propulsive force of the dilator 3 resulting from screwing action.

Figure 5:
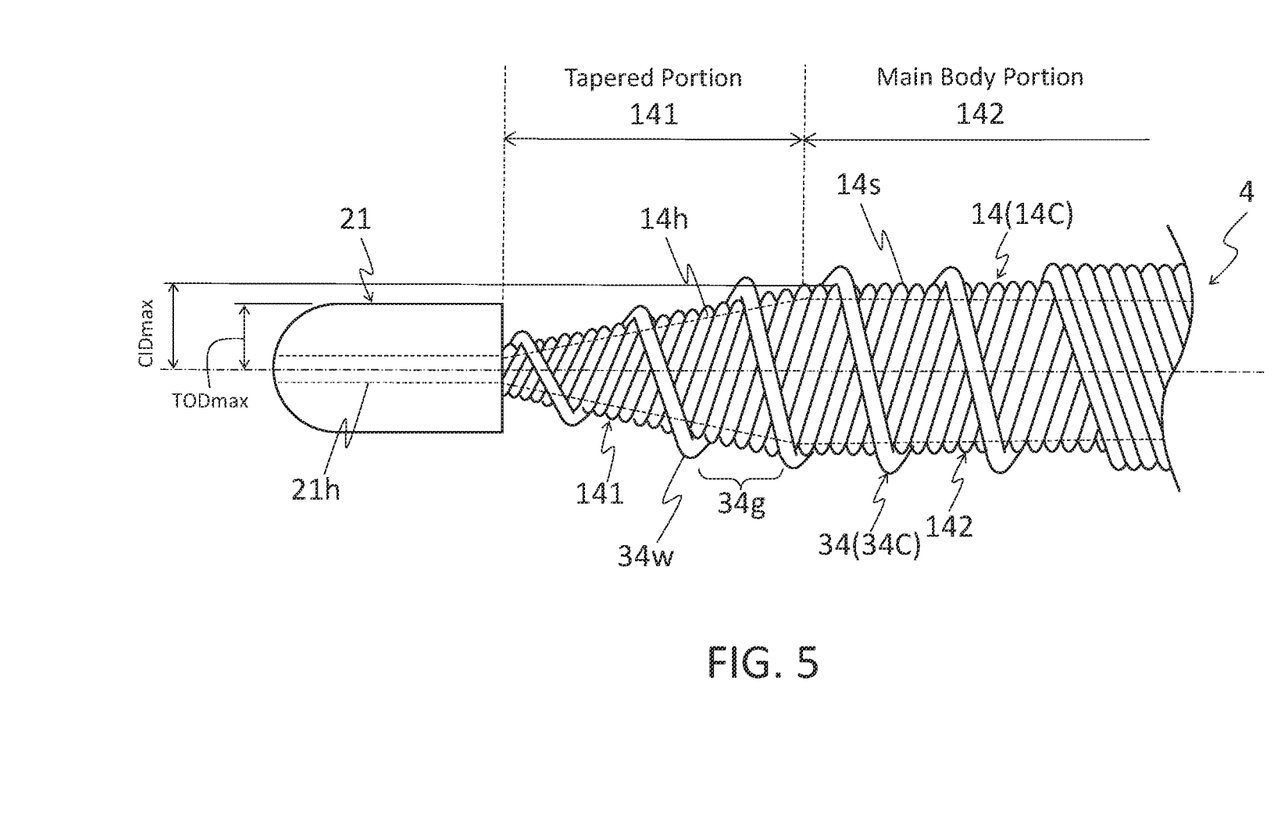
FIG. 5 is a schematic side view illustrating another embodiment of a dilator of the present disclosure.

FIG. 5 is a schematic side view illustrating a dilator 4. The dilator 4 includes a hollow shaft 14, a distal tip 21, a spirally-arranged protruding portion 34, and a base portion 41 (not shown), as shown in FIG. 5. The dilator 4 differs from that of the dilator 1 in that it includes the hollow shaft 14 and the spirally-arranged protruding portion 34. Since the configurations of the distal tip 21 and the base portion 41 are the same as those of the dilator 1, the same portions/positions are represented by the same reference signs, and detailed descriptions thereof will not be repeated. Further, since the configurations other than the configurations of the hollow shaft 14 and the spirally-arranged protruding portion 34 shown below and the use mode of the dilator 4 are the same as those of the dilator 1, detailed descriptions thereof will not be repeated.

The hollow shaft 14 is a hollow-shaped shaft. The hollow shaft 14 has a tapered portion 141, a main body portion 142, and an inner cavity 14h, for example.

The tapered portion 141 is a portion, wherein the outer diameter of the distal end is smaller than the outer diameter of the proximal end. The main body portion 142, whose distal end is located at the proximal end of the tapered portion 141, is a portion provided to extend toward the proximal end side. The main body portion 142 has the same outer diameter as that of the proximal end of the tapered portion 141. The inner cavity 14h is a through-hole for insertion of a guide wire (not shown) or the like.

The spirally-arranged protruding portion 34 is a portion provided on at least the outer peripheral surface of the tapered portion 141. The spirally-arranged protruding portion 34 is configured of a coil body 34C ("second coil body 34C") formed by winding a wire 34w and has gaps 34g at portions adjacent to each other along the longitudinal direction of the hollow shaft 14.

Further, the dilator 4 is formed in such a manner that the inner peripheral radius (CIDmax) of a portion, which is the maximum inner peripheral radius of the spirally-arranged protruding portion 34, is larger than the outer peripheral radius (TODmax) of a portion, which is the maximum outer peripheral radius of the distal tip 21. Specifically, for example, the dilator 4 may be formed in such a manner that the outer diameter of the proximal end of the tapered portion 141 of the above hollow shaft 14 is larger than that of the tapered portion 131 of the dilator 3 (see FIG. 5). Accordingly, the inner peripheral radius (CIDmax) of the second coil body 34C may be larger than the outer peripheral radius (TODmax) of the distal tip 21. Such a portion of the spirally-arranged protruding portion 34 having the inner peripheral radius (CIDmax) may be a portion on the tapered portion 141 (not shown) or a portion on the main body portion 142 (see FIG. 5).

The dilator 4 is as configured above. Hence, the outer periphery of the spirally-arranged protruding portion 34 protrudes from the distal tip 21 as in a front view, so as to be able to further increase the propulsive force of the dilator 4 resulting from screwing action.

Note that the dilators of the present disclosure are not limited to the configurations of the above-described dilators, but are defined by the terms of the claims and are intended to include any modifications within the scope and meaning equivalent to the terms of the claims.

For example, in the dilator 1, the portion having the inner peripheral radius (CIDmin) is located at the distal end of the spirally-arranged protruding portion 31. However, the portion having the inner peripheral radius (CIDmin) may be any portion of the spirally-arranged protruding portion in the longitudinal direction (for example, a portion located in the middle of or at the proximal end of the spirally-arranged protruding portion in the longitudinal direction).

Further, the hollow shaft 12 formed by casting or the like as described for the dilator 2 is also applicable to all the other dilators disclosed in and encompassed by this specification.

Further, in the dilator 3, through adjustment of the outer diameter of the hollow shaft 13, the outer peripheral radius (CODmax) of the spirally-arranged protruding portion 33 is larger than the outer peripheral radius (TODmax) of the distal tip 21. However, the dilators of the present disclosure may be formed such that through adjustment of the wire diameter of the second coil body or adjustment of both the outer diameter of the hollow shaft and the wire diameter of the second coil body, the outer peripheral radius (CODmax) of the spirally-arranged protruding portion is larger than the outer peripheral radius (TODmax) of the distal tip.

Further, in the dilators 1 to 4, the portion having the inner peripheral radius (CIDmin) is located at only one position of each of the spirally-arranged protruding portions 31 to 34. However, such portion having the inner peripheral radius (CIDmin) may also be provided at two or more positions of the spirally-arranged protruding portion, which are spaced away from each other.

Further, in the dilators 1 to 4, the portions having the inner peripheral radius (CIDmin), the outer peripheral radius (CODmax), and the central radius (CMD), respectively, are provided at specific positions of each of the spirally-arranged protruding portions 31 to 34. However, each of the above portions may be provided at any position of the spirally-arranged protruding portion in the longitudinal direction (any position on the tapered portion and/or on the main body portion of the hollow shaft).

The invention claimed is:

1. A dilator, comprising:
   a hollow shaft having a tapered portion, the tapered portion including a proximal end having an outer diameter, a distal end having an outer diameter, and an outer peripheral surface, the outer diameter of the distal end being smaller than the outer diameter of the proximal end, and the hollow shaft having an inner cavity for insertion of a guide wire;
   a distal tip having a proximal end located at the distal end of the tapered portion, the distal tip having a distal tip inner cavity that communicates with the inner cavity of the hollow shaft and through which the guide wire may be inserted such that the guide wire extends distally beyond the distal tip; and
   a spirally-arranged protruding portion provided on at least the outer peripheral surface of the tapered portion, wherein:
   the spirally-arranged protruding portion is formed by winding a wire and has gaps between wire portions adjacent to each other along a longitudinal direction of the hollow shaft;
   the spirally-arranged protruding portion has a portion having a minimum inner peripheral radius that is smaller than a maximum outer peripheral radius of the distal tip; and
   the distance between a long axis of the hollow shaft and the center of the wire at the portion having the minimum inner peripheral radius of the spirally-arranged protruding portion is smaller than the maximum outer peripheral radius of the distal tip.

2. The dilator according to claim 1, wherein the spirally-arranged protruding portion has a maximum outer peripheral radius that is larger than the maximum outer peripheral radius of the distal tip.

3. The dilator according to claim 2, wherein a maximum outer peripheral radius of the spirally-arranged protruding portion on the tapered portion is larger than the maximum outer peripheral radius of the distal tip.

4. The dilator according to claim 2, wherein the spirally-arranged protruding portion has a maximum inner peripheral radius that is larger than the maximum outer peripheral radius of the distal tip.

5. The dilator according to claim 1, wherein the spirally-arranged protruding portion is not joined to the tapered portion.

6. A dilator, comprising:
   a hollow shaft having a tapered portion, the tapered portion including a proximal end having an outer diameter, a distal end having an outer diameter, and an outer peripheral surface, the outer diameter of the distal end being smaller than the outer diameter of the proximal end;
   a distal tip having a proximal end located at the distal end of the tapered portion; and
   a spirally-arranged protruding portion provided on at least the outer peripheral surface of the tapered portion, wherein:
   the spirally-arranged protruding portion is formed by winding a wire and has gaps between wire portions adjacent to each other along a longitudinal direction of the hollow shaft;
   the spirally-arranged protruding portion has a portion having a minimum inner peripheral radius that is smaller than a maximum outer peripheral radius of the distal tip;
   the spirally-arranged protruding portion has a maximum outer peripheral radius that is larger than the maximum outer peripheral radius of the distal tip; and
   the distance between a long axis of the hollow shaft and the center of the wire at the portion having the minimum inner peripheral radius of the spirally-arranged protruding portion is smaller than the maximum outer peripheral radius of the distal tip.

7. The dilator according to claim 6, wherein the spirally-arranged protruding portion has a maximum inner peripheral radius that is larger than the maximum outer peripheral radius of the distal tip.

8. The dilator according to claim 6, wherein the portion having the minimum inner peripheral radius of the spirally-arranged protruding portion is located at a distal end of the spirally-arranged protruding portion.

9. The dilator according to claim 6, wherein the spirally-arranged protruding portion is not joined to the tapered portion.

10. A dilator, comprising:
    a hollow shaft having a tapered portion, the tapered portion including a proximal end having an outer diameter, a distal end having an outer diameter, and an outer peripheral surface, the outer diameter of the distal end being smaller than the outer diameter of the proximal end;
    a distal tip having a proximal end located at the distal end of the tapered portion, the distal tip having a distal tip inner cavity that communicates with the inner cavity of the hollow shaft and through which the guide wire may be inserted such that the guide wire extends distally beyond the distal tip and
    a spirally-arranged protruding portion provided on at least the outer peripheral surface of the tapered portion, wherein:
    the spirally-arranged protruding portion is formed by winding a wire and has gaps between wire portions adjacent to each other along a longitudinal direction of the hollow shaft;
    the spirally-arranged protruding portion has a portion having a minimum inner peripheral radius that is smaller than a maximum outer peripheral radius of the distal tip;

the distance between a long axis of the hollow shaft and the center of the wire at the portion having the minimum inner peripheral radius of the spirally-arranged protruding portion is smaller than the maximum outer peripheral radius of the distal tip; and the portion having the minimum inner peripheral radius of the spirally-arranged protruding portion is located at a distal end of the spirally-arranged protruding portion.

11. The dilator according to claim 10, wherein the spirally-arranged protruding portion has a maximum outer peripheral radius that is larger than the maximum outer peripheral radius of the distal tip.

12. The dilator according to claim 11, wherein the spirally-arranged protruding portion has a maximum inner peripheral radius that is larger than the maximum outer peripheral radius of the distal tip.

13. The dilator according to claim 10, wherein the spirally-arranged protruding portion is not joined to the tapered portion.

* * * * *